Patented Mar. 2, 1948

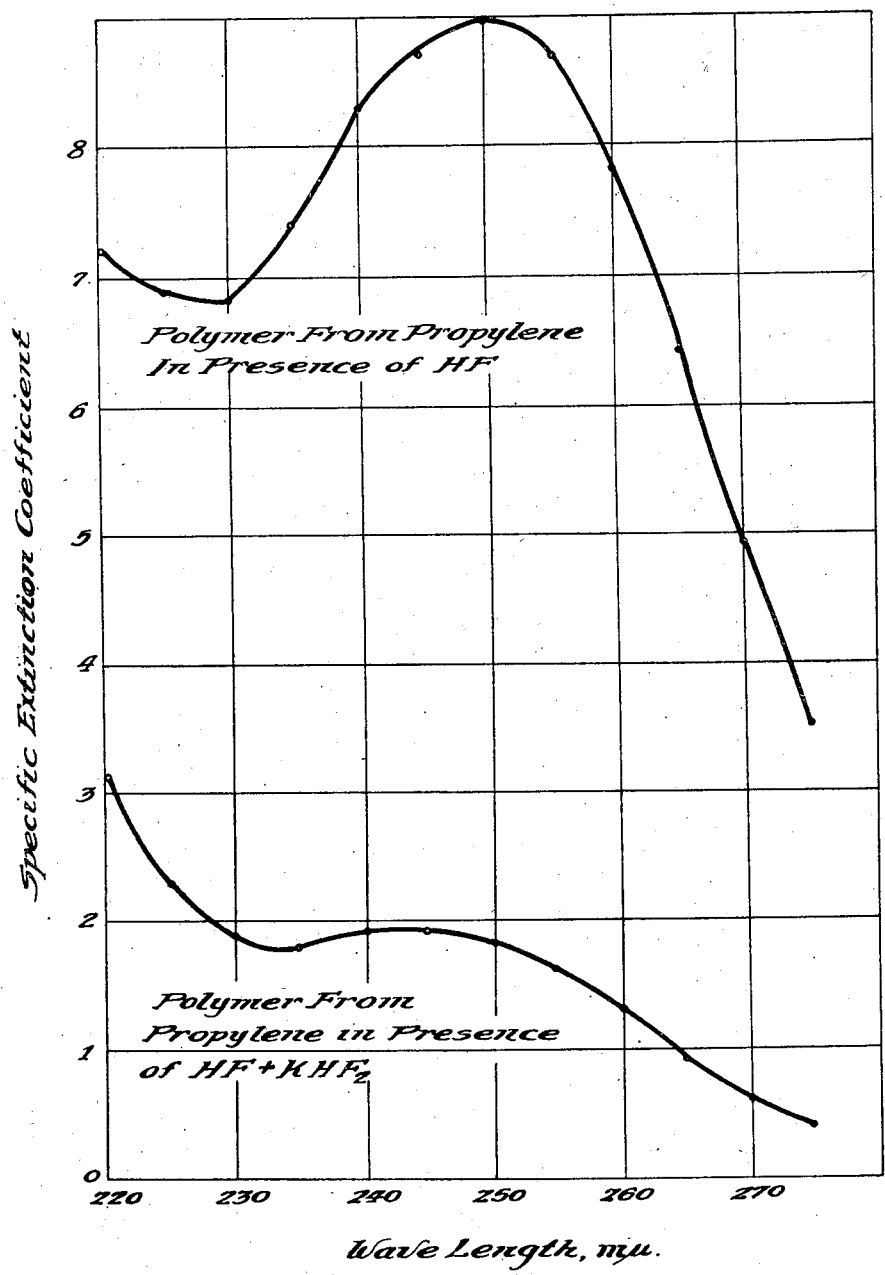

2,436,929

UNITED STATES PATENT OFFICE 2,436,929

POLYMERIZATION OF OLEFINIC HYDROCARBONS

Carl B. Linn, Riverside, Ill., assignor to Universal Oil Products Company, Chicago, Ill., a corporation of Delaware Application May 31, 1945, Serial No. 596,922

14 Claims. (Cl. 260—683.15)

This invention relates to the polymerization of olefinic hydrocarbons in the presence of a special type of catalyst which I have heretofore disclosed for use in the alkylation of isoparaffins with olefins in my copending application Serial No. 424,783, now U. S. Patent No. 2,430,181, filed December 29, 1941. More particularly, this invention relates to the polymerization of propylene and butylenes into normally liquid hydrocarbons boiling within the approximate range of gasoline.

An object of this invention is to polymerize olefinic hydrocarbons in the presence of a liquid catalytic material.

Another object of this invention is to convert propylene and butylenes into normally liquid hydrocarbons in the presence of a liquid catalyst.

A further object of this invention is to polymerize olefinic hydrocarbons including monoolefins and polyolefins in the presence of a catalyst mixture comprising hydrogen fluoride as its essential active ingredient.

One specific embodiment of this invention relates to a process for producing hydrocarbons of higher molecular weight which comprises reacting an olefinic hydrocarbon having at least 3 carbon atoms per molecule at polymerizing conditions in the presence of liquid hydrogen fluoride and an inorganic salt selected from the group consisting of the alkali metal fluorides and sulfates.

Another embodiment of this invention relates to a polymerization process which comprises reacting an olefinic hydrocarbon having at least 3 carbon atoms per molecule in the presence of a major proportion by weight of liquid hydrogen fluoride and a minor proportion of an inorganic salt soluble in liquid hydrogen fluoride and selected from the group consisting of the alkali metal fluorides and sulfates.

A further embodiment of this invention relates to a polymerization process which comprises reacting an olefinic hydrocarbon having at least 3 carbon atoms per molecule in the presence of a liquid hydrogen fluoride catalyst having dissolved therein a minor proportion of an alkali metal fluoride.

Normally gaseous and liquid olefinic hydrocarbons which are polymerizable by the process of the present invention occur together with paraffinic or saturated hydrocarbons in commercial hydrocarbon mixtures such as those encountered in the cracking of petroleum, in gas making processes, and as by-products of various chemical industries. Normally gaseous monoolefins, such as propylene and butylenes, and normally liquid olefins including amylenes, hexenes, and higher olefins, may be obtained also by catalytic dehydrogenation of paraffins, by pyrolysis of certain paraffinic hydrocarbons, and by dehydration of alcohols. Polyolefins and cyclic olefins are also olefinic hydrocarbons which may be polymerized in my process and these hydrocarbons include particularly butadiene, isoprene, cyclohexene, alkyl cyclohexenes, and cyclopentene hydrocarbons.

In general, olefins have a relatively high activity and even under mild catalytic influence they exhibit this activity by their pronounced tendency to polymerize and form substances of higher molecular weights. This process is particularly effective for converting propylene and butylenes into normally liquid polymers.

The present process is directed particularly to the production of polymers containing from about 6 to about 12 and more carbon atoms per molecule from propylene and butylenes. The preferred polymer products boil at temperatures within the approximate boiling range of commercial gasoline. These polymers containing from about 6 to about 12 carbon atoms per molecule are useful for blending with straight-run gasoline to increase its antiknock value.

By the addition to liquid hydrogen fluoride of an inorganic salt soluble therein, and particularly an alkali metal fluoride or sulfate, the ordinarily vigorous reaction of hydrogen fluoride on catalytic polymerization reactions of olefins is moderated. Thus, I have found that substantial yields of liquid polymers of relatively low molecular weights are produced when propylene, butylenes, and higher olefins are reacted at temperatures of from about −50° to about 250° C., but preferably at a temperature of from about 20° to about 150° C. in the presence of a catalyst comprising essentially a major proportion of hydrogen fluoride and a minor proportion of an inorganic salt soluble therein. The polymerization treatment is generally carried out at a pressure sufficient to maintain the reacting hydrocarbons and catalyst in substantially liquid phase.

Accordingly, the present invention deals with a hydrogen fluoride polymerization catalyst modified by the addition thereto of a non-oxidizing salt which moderates the action of hydrogen fluoride and influences the polymerization reaction in such a way as to improve the yield and quality of relatively low boiling but normally liquid products. In fact, the polymers formed in the presence of my mixed catalyst comprising hydrogen fluoride and an alkali metal salt differ considerably from polymers formed from the same olefinic charging stock but in the presence of substantially anhydrous hydrogen fluoride as the sole catalyst. In the presence of my mixed catalyst, mono-olefinic hydrocarbons are converted into polymers comprising essentially mono-olefinic hydrocarbons, whereas in the presence of substantially anhydrous hydrogen fluoride, the same mono-olefinic hydrocarbon charging stock undergoes conjunct polymerization and forms a complex mixture of hydrocarbons containing paraffins, olefins, cyclic hydrocarbons and a relatively high proportion of conjugated diolefins. The presence of conjugated diolefins in the polymer formed in the presence of hydrogen fluoride as the sole catalyst is evidenced by the so-called specific extinction coefficient obtained by ultra-violet absorption analysis of the hydrocarbon products. In order to interpret the results of these ultra-violet absorption analyses, use is made of the "specific extinction coefficient," which is equal to $$\frac{\log_{10} \frac{I_0}{I}}{CL}$$

where $I_0$ = intensity of incident light (cell filled with iso-octane)
$I$ = intensity of transmitted light (cell filled with solution of polymer in iso-octane solvent)
$C$ = concentration of polymer in cell in grams per liter
$L$ = length of cell path in centimeters Iso-octane, more exactly known as 2,2,4-trimethylpentane, is employed as the solvent since this octane gives substantially no ultra-violet absorption in the region examined.

Other work on various hydrocarbons of known structures has indicated that a high specific extinction coefficient in the region around 250 m$\mu$ denotes the presence in said hydrocarbons of a relatively high proportion of conjugated unsaturation. The results shown in a later example indicate a greater simplicity of the polymers formed in the presence of my hydrogen fluoride-alkali metal salt catalyst than in polymers formed in the presence of anhydrous hydrogen fluoride.

The alkali metal fluorides and sulfates utilizable in the present process as diluents or spacing agents for a liquid hydrogen fluoride polymerization catalyst comprise generally the fluorides and sulfates of sodium, potassium, rubidium, and cesium, and particularly the fluorides and sulfates of sodium. These fluorides and sulfates are soluble to a substantial extent in liquid hydrogen fluoride, particularly of 90 to 100% hydrogen fluoride concentration. Ordinarily the mixed catalyst utilized in my polymerization process comprises from about 0.5 to about 30% by weight of the inorganic salt.

My polymerization process may be carried out in a batch operation but it is effected preferably in continuous types of operation. In batch type treatment an olefinic hydrocarbon, and generally a monoolefinic hydrocarbon or a hydrocarbon fraction containing mono-olefins, may be agitated with a mixture of hydrogen fluoride and an alkali metal fluoride or sulfate in an autoclave or other reactor of suitable design. It is usually necessary to include a cooling zone or other heat exchange means in the polymerization zone or between such zones if a multiple polymerization reactor system is employed.

Continuous operation of my process may be carried out by passing a mixture of an olefin-containing hydrocarbon fraction and a mixture of hydrogen fluoride and an alkali metal fluoride or sulfate through a suitable reactor or group of reactors, separating liquid polymers from unconverted olefins and catalyst mixture and recycling the unconverted olefins and catalyst mixture to the polymerization zone of the process.

The following example is given to indicate results obtained by the present process, although with no intention of limiting the scope of the invention in exact correspondence with the numerical results presented.

150 grams of propylene, 77 grams of liquid hydrogen fluoride of 99% concentration, and 20 grams of potassium acid fluoride were contacted at 95° C. for two hours in an autoclave equipped with a pressure-sealed stirring device. The reaction product consisted of 80 grams of liquid hydrocarbon polymer and 100 grams of isopropyl fluoride, the latter formed by direct union of hydrogen fluoride with propylene. After being washed with caustic and with water, the liquid hydrocarbon polymer had a refractive index, $n_D^{20}$, of 1.4485. This hydrocarbon oil contained 0.1% fluoride, had a bromine number of 49 and an average molecular weight of 257. It was subjected to an ultra-violet absorption analysis in which the specific extinction coefficients were determined for wave lengths between 220 and 275m$\mu$. These results which are expressed graphically in the attached drawing show that the polymer formed in the presence of my composite catalyst is less complex and contains a lower percentage of conjugated double bonds than present in similar polymer produced at the same reaction temperature in the presence of anhydrous hydrogen fluoride. The operating conditions used in these runs with the hydrogen fluoride-potassium acid fluoride catalyst and with hydrogen fluoride and the results obtained are given in the table.

Table

| Run No. | 1 | 2 |
|---|---|---|
| Temperature, °C. | 95 | 95 |
| Contact Time, Hours | 2 | 2 |
| Charged, grams: | | |
| Propylene | 150 | 150 |
| Hydrogen fluoride | 77 | 87 |
| Potassium Acid Fluoride | 20 | 0 |
| Recovered, grams: | | |
| Liquid Polymers | 80 | 143 |
| Isopropyl fluoride | 100 | 6 |
| Properties of Product: | | |
| $n_D^{20}$ | 1.4485 | 1.4567 |
| Wt. Per Cent Fluorine | 0.10 | 0.12 |
| Bromine Number | 49 | 79 |
| Molecular weight | 257 | 240 |
| Calc. Br. Number for found M. W. | 64 | 67 |
| Wt. Per Cent of 204° C. E. P. Gaso. | 22 | 22 |
| Ultra-violet absorption analysis | Specific Extinction Coefficient | |
| Wave length m$\mu$: | | |
| 220 | 3.1 | 7.2 |
| 225 | 2.3 | 6.9 |
| 230 | 1.9 | 6.8 |
| 235 | 1.8 | 7.4 |
| 240 | 1.9 | 8.3 |
| 245 | 1.9 | 8.7 |
| 250 | 1.8 | 9.0 |
| 255 | 1.6 | 8.7 |
| 260 | 1.3 | 7.8 |
| 265 | 0.9 | 6.4 |
| 270 | 0.6 | 4.9 |
| 275 | 0.4 | 3.5 |

The foregoing specification and example indicate the character of the process of the present invention and the nature of results obtainable although neither section is introduced to unduly limit the generally broad scope of the invention.

I claim as my invention:

1. A process for producing hydrocarbons of higher molecular weight which comprises polymerizing an olefinic hydrocarbon having at least 3 carbon atoms per molecule in the presence of a catalyst consisting essentially of liquid hydrogen fluoride containing an inorganic salt selected from the group consisting of the alkali metal fluorides and sulfates.

2. A process which comprises polymerizing an olefinic hydrocarbon having at least 3 carbon atoms per molecule at a temperature of from about —50° to about 250° C. in the presence of a catalyst consisting essentially of liquid hydrogen fluoride containing an inorganic salt selected from the group consisting of the alkali metal fluorides and sulfates.

3. A polymerization process which comprises polymerizing an olefinic hydrocarbon having at least 3 carbon atoms per molecule in the presence of a catalyst consisting essentially of liquid hydrogen fluoride having dissolved therein a minor proportion by weight of an inorganic salt soluble in liquid hydrogen fluoride and selected from the group consisting of the alkali metal fluorides and sulfates.

4. A polymerization process which comprises polymerizing an olefinic hydrocarbon having at least 3 carbon atoms per molecule in the presence of a catalyst consisting essentially of liquid hydrogen fluoride having dissolved therein a minor proportion by weight of an alkali metal fluoride.

5. A process for producing hydrocarbons of higher molecular weight which comprises polymerizing an olefinic hydrocarbon having at least 3 carbon atoms per molecule at a temperature of from about —50° to about 250° C. in the presence of a catalyst consisting essentially of liquid hydrogen fluoride containing an inorganic salt selected from the group consisting of the alkali metal fluorides and sulfates.

6. A polymerization process which comprises polymerizing an olefinic hydrocarbon having at least 3 carbon atoms per molecule at a temperature of from about —50° to about 250° C. in the presence of a catalyst consisting essentially of liquid hydrogen fluoride having dissolved therein a minor proportion by weight of an inorganic salt soluble in liquid hydrogen fluoride and selected from the group consisting of the alkali metal fluorides and sulfates.

7. A polymerization process which comprises polymerizing an olefinic hydrocarbon having at least 3 carbon atoms per molecule at a temperature of from about —50° to about 250° C. in the presence of a catalyst consisting essentially of liquid hydrogen fluoride having dissolved therein a minor proportion by weight of an alkali metal fluoride.

8. A polymerization process which comprises polymerizing an olefinic hydrocarbon having at least 3 carbon atoms per molecule at a temperature of from about 20° to about 150° C. in the presence of a catalyst consisting essentially of liquid hydrogen fluoride having dissolved therein a minor proportion by weight of an alkali metal fluoride.

9. A polymerization process which comprises polymerizing propylene at a temperature of from about 20° to about 150° C. in the presence of a catalyst consisting essentially of liquid hydrogen fluoride having dissolved therein a minor proportion by weight of an alkali metal fluoride.

10. A polymerization process which comprises polymerizing butylene at a temperature of from about 20° to about 150° C. in the presence of a catalyst consisting essentially of liquid hydrogen fluoride having dissolved therein a minor proportion of an alkali metal fluoride.

11. A polymerization process which comprises polymerizing propylene and butylene at a temperature of from about 20° to about 150° C. in the presence of a catalyst consisting essentially of liquid hydrogen fluoride having dissolved therein a minor proportion of an alkali metal fluoride.

12. A process for producing hydrocarbons of higher molecular weight which comprises polymerizing an olefinic hydrocarbon in the presence of a catalyst consisting essentially of a solution predominating in liquid hydrogen fluoride and containing a minor proportion of an inorganic salt selected from the group consisting of the alkali metal fluorides and sulfates.

13. A process for producing hydrocarbons of higher molecular weight which comprises polymerizing an olefinic hydrocarbon in the presence of a catalyst consisting essentially of a solution predominating in liquid hydrogen fluoride and containing a minor proportion of an alkali metal fluoride.

14. A process for producing hydrocarbons of higher molecular weight which comprises polymerizing an olefinic hydrocarbon in the presence of a catalyst consisting esentially of a solution predominating in liquid hydrogen fluoride and containing a minor proportion of an alkali metal sulfate.

CARL B. LINN.

REFERENCES CITED

The following references are of record in the file of this patent:

UNITED STATES PATENTS

| Number | Name | Date |
|---|---|---|
| 2,366,736 | Linn et al. | Jan. 9, 1945 |